US009190864B2

(12) United States Patent
Ogihara et al.

(10) Patent No.: US 9,190,864 B2
(45) Date of Patent: Nov. 17, 2015

(54) CHARGING CONTROL METHOD FOR SECONDARY CELL AND CHARGING CONTROL DEVICE FOR SECONDARY CELL (71) Applicant: Nissan Motor Co., Ltd., Yokohama-shi, Kanagawa (JP)

(72) Inventors: Wataru Ogihara, Zushi (JP); Hideaki Tanaka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/406,652

(22) PCT Filed: May 22, 2013

(86) PCT No.: PCT/JP2013/064182
§ 371 (c)(1),
(2) Date: Dec. 9, 2014

(87) PCT Pub. No.: WO2014/010312
PCT Pub. Date: Jan. 16, 2014

(65) Prior Publication Data
US 2015/0188327 A1 Jul. 2, 2015

(30) Foreign Application Priority Data

Jul. 12, 2012 (JP) ................. 2012-156668

(51) Int. Cl.
H02J 7/00 (2006.01)
H01M 4/505 (2010.01)
H01M 4/525 (2010.01)
H01M 10/44 (2006.01)
H01M 10/052 (2010.01)

(52) U.S. Cl.
CPC ............... *H02J 7/007* (2013.01); *H01M 4/505* (2013.01); *H01M 4/525* (2013.01); *H01M 10/44* (2013.01); *H02J 7/008* (2013.01); *H01M 10/052* (2013.01); *Y02E 60/122* (2013.01)

(58) Field of Classification Search
CPC ...... Y02E 60/12; H02J 7/0042; H02J 7/0045; H02J 7/0031; H02J 2007/004; H02J 2007/0037; H02J 7/008; H02J 7/0073; H02J 7/0081; H02J 7/14; H01M 10/46; H01M 10/44; H01M 10/48

USPC .......................................... 320/107
See application file for complete search history.

(56) References Cited

U.S. PATENT DOCUMENTS 5,572,159 A * 11/1996 McFarland .............. G05F 1/466
  327/276
5,572,395 A * 11/1996 Rasums ................. H02H 9/004
  361/18
2008/0191667 A1* 8/2008 Kernahan .............. H01M 10/44
  320/150
2011/0037438 A1* 2/2011 Bhardwaj ............. H02J 7/0073
  320/152

FOREIGN PATENT DOCUMENTS

| JP | 10-14121 A | 1/1998 |
| JP | 10-145981 A | 5/1998 |
| JP | 2002-58171 A | 2/2002 |
| JP | 2002-142379 A | 5/2002 |
| JP | 2003-87991 A | 3/2003 |
| JP | 2008-270201 A | 11/2008 |
| JP | 2009-106118 A | 5/2009 |
| JP | 2010-252474 A | 11/2010 |

* cited by examiner

Primary Examiner — Arun Williams
(74) Attorney, Agent, or Firm — Global IP Counselors, LLP (57) ABSTRACT A method for controlling charging of a secondary cell including a positive electrode containing a positive-electrode active substance having that increases resistance in accordance with an increase in the SOC, a negative electrode; and a non-aqueous electrolyte includes performing constant-current charging at a set current value to a prescribed upper-limit voltage, performing constant-voltage charging at the upper-limit voltage after the upper-limit voltage $V_1$ has been reached, and terminating charging of the secondary cell when the charging current in the constant-voltage charging has decreased to a cutoff current value, the cutoff current value being set to a current value that complies with the relationships in formulas (I) and (II):

Cutoff current value $A_2 \geq$ set current value $A_1 \times X$     (I)

X=(cell resistance $R_1$ of secondary cell in target SOC [Ω]×set current value $A_1$ [A])/upper-limit voltage $V_1$ [V].     (II)

5 Claims, 5 Drawing Sheets

CHARGING CONTROL METHOD FOR SECONDARY CELL AND CHARGING CONTROL DEVICE FOR SECONDARY CELL

CROSS-REFERENCE TO RELATED APPLICATIONS

This application is a U.S. National stage application of International Application No. PCT/JP2013/064182 filed, May 22, 2013, which claims priority to Japanese Patent Application No. 2012-156668 filed in Japan on Jul. 12, 2012, the contents of each of which are hereby incorporated herein by reference.

BACKGROUND

1. Field of the Invention

The present invention relates to a method and device for controlling charging of a secondary cell.

2. Background Information

In recent years, a variety of positive-electrode active substances have been examined with the objective of raising the voltage and capacity of lithium-ion secondary cells and other secondary cells. Such positive-electrode active substances include, e.g., $Li_2MnO_3$—$LiMO_2$ (where M is a transition metal having an average oxidation state of +3) and other solid solution materials disclosed in Japanese Laid-Open Patent Application No. 2008-270201.

SUMMARY

A feature of positive-electrode materials having high theoretical capacity, such as the solid solution materials disclosed in Japanese Laid-Open Patent Application No. 2008-270201, is that resistance increases in a high-SOC region. Therefore, when a secondary cell using such positive-electrode materials is charged using constant-current/constant-voltage charging, the positive/negative electrode potential changes during the constant-voltage charging process (particularly in the end stage of charging), and non-aqueous-electrolyte decomposition, lithium deposition, and other side reactions occur, resulting in diminished cycling characteristics.

The present invention improves the cycling characteristics of a secondary cell in which there is used, as a positive-electrode material, a positive-electrode active substance having the feature that resistance increases in accordance with an increase in the SOC.

The present invention solves the aforementioned problem by a method for controlling charging of a secondary cell in which there is used, as a positive-electrode material, a positive-electrode active substance having an open-circuit voltage curve that differs during charging and during discharging, wherein a cutoff current value $A_2$ for charging using constant-current/constant-voltage charging is set to a current value equal to or greater than the product ($A_1 \times X$) of a set current value $A_1$ during constant-current charging and a threshold coefficient X calculated from a cell resistance $R_1$ of a secondary cell at a target SOC, the set current value $A_1$ during constant-current charging, and the upper-limit voltage of charging.

According to the present invention, charging is terminated at a prescribed cutoff current when charging a secondary cell in which there is used, as a positive-electrode material, a positive-electrode active substance having the feature that resistance increases in accordance with an increase in the SOC, whereby side reactions associated with excessive current impressing can be suppressed. This makes it possible to improve the charge/discharge efficiency of the secondary cell, resulting in an improvement in the cycling characteristics.

BRIEF DESCRIPTION OF THE DRAWINGS

Referring now to the attached drawings which form a part of this original disclosure.

DETAILED DESCRIPTION OF EMBODIMENTS

A preferred embodiment of the present invention is described below based on the accompanying drawings.

Figure 1:
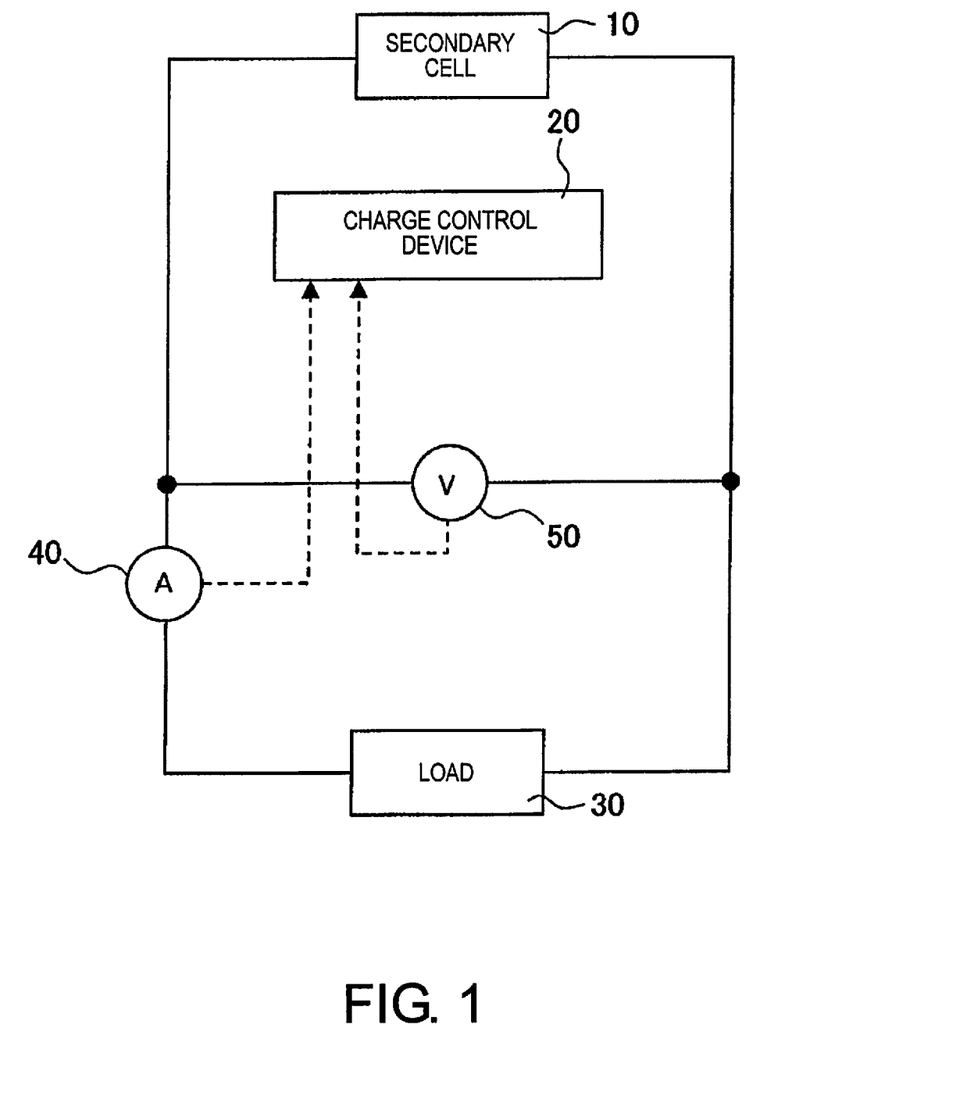
FIG. 1 is a schematic overview showing the charge control system for a secondary cell of the present embodiment.

FIG. 1 is a view of the configuration of a system for controlling charging of the secondary cell of the present embodiment. This charge control system comprises a secondary cell 10, a control device 20, a load 30, an ammeter 40, and a voltmeter 50, as shown in FIG. 1.

The charge control device 20 is used for controlling the secondary cell 10, the charge control device 20 performing a control for charging and discharging the secondary cell 10 based on the charging/discharging current flowing through the secondary cell 10 as detected by the ammeter 40 and the terminal voltage of the secondary cell 10 as detected by the voltmeter 50.

The load 30 includes a wide variety of devices powered by the secondary cell 10; for example, when the system for controlling a secondary cell of the present embodiment is applied to an electric vehicle, the load 30 can be configured from an inverter and a motor. Specifically, when the load 30 is configured from an inverter and a motor, direct-current electric power supplied from the secondary cell 10 is converted into alternating-current electric power by the inverter and supplied to the motor. When the load 30 is configured from an inverter and a motor, a configuration may be adopted to have regenerative electric power generated by the rotation of the motor be converted into direct-current electric power via the inverter and used to charge the secondary cell 10.

Figure 2:
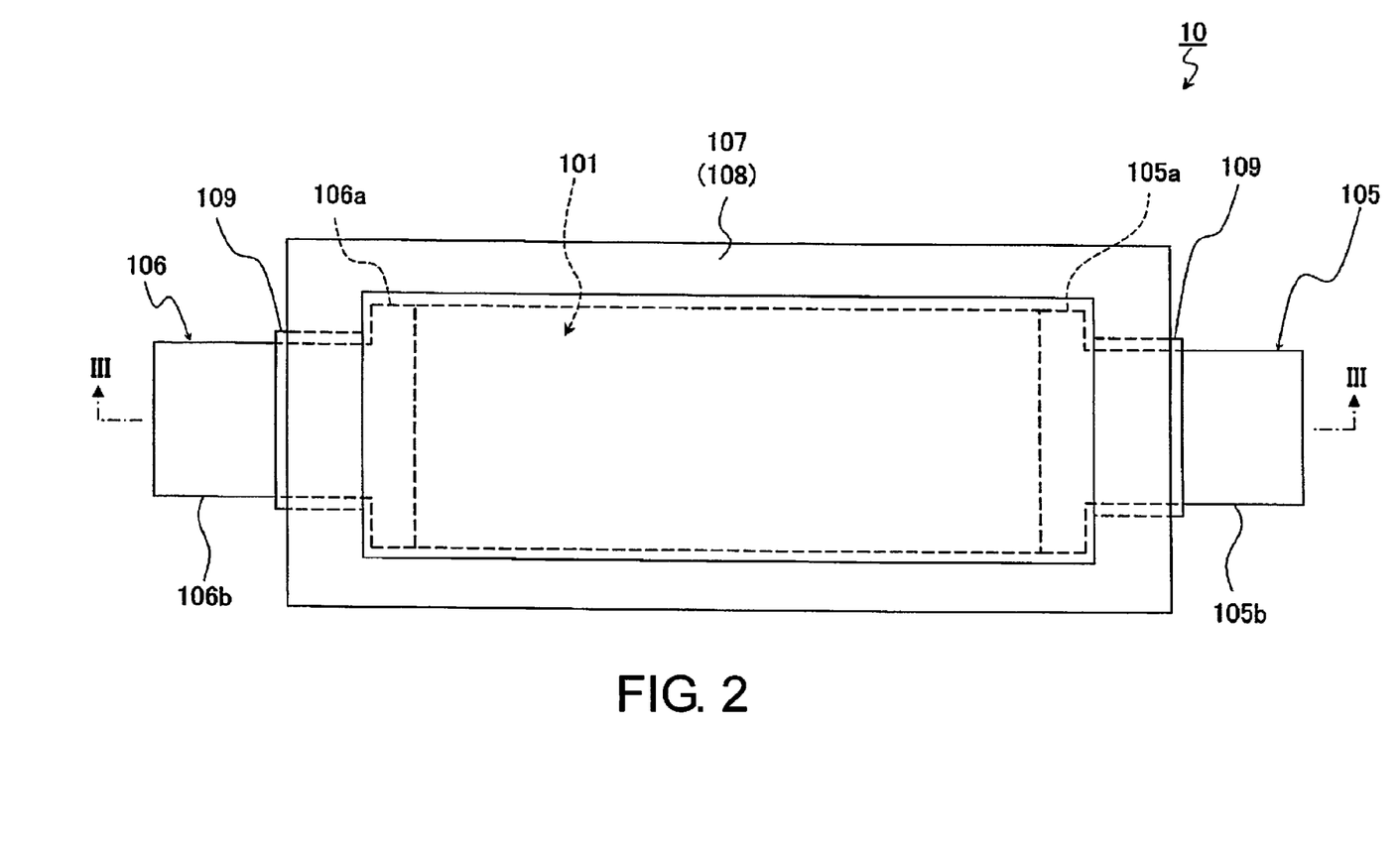
FIG. 2 is a plan view of the secondary cell of the present embodiment.

Examples of the secondary cell 10 include, e.g., lithium-ion secondary cells and other lithium-based secondary cells. FIG. 2 shows a plan view of the secondary cell 10 of the present embodiment, and FIG. 3 shows a sectional view of the secondary cell 10 across line III-III in FIG. 2.

Figure 3:
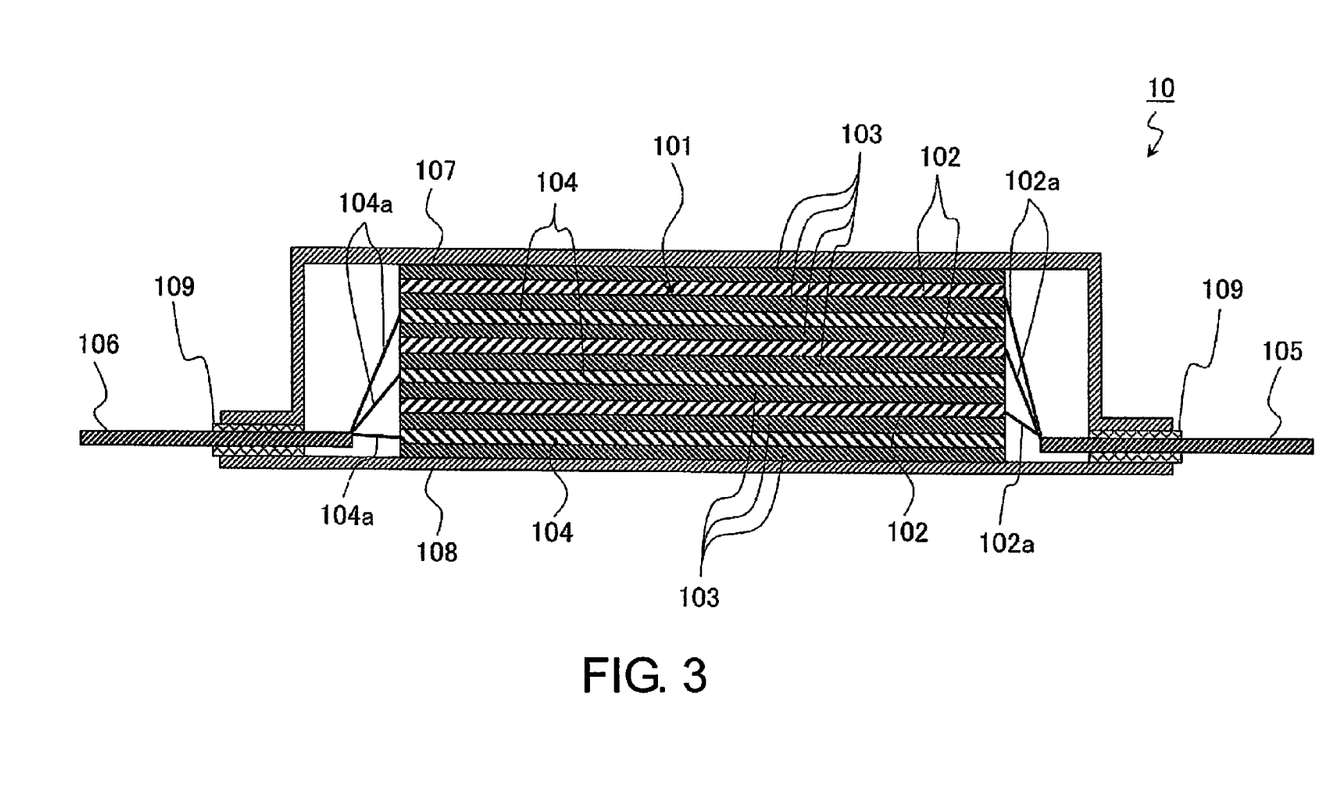
FIG. 3 is a sectional view of the secondary cell across line in FIG. 2.

The secondary cell 10, as shown in FIGS. 2 and 3, is formed from: an electrode layered body 101 having three positive plates 102, seven separators 103, and three negative plates 104; a positive-electrode tab 105 and a negative-electrode tab 106, each of which being connected to the electrode layered body 101; an upper external covering component 107 and a lower external covering component 108 for accommodating and sealing the electrode layered body 101 and the positive- and negative-electrode tabs 105, 106; and a non-aqueous electrolyte (not shown).

The number of positive plates 102, separators 103, and negative plates 104 is not particularly limited; the electrode layered body 101 may be configured from one positive plate 102, three separators 103, and one negative plate 104. The number of positive plates 102, separators 103, and negative plates 104 may be appropriately selected as necessary.

The positive plates 102 constituting the electrode layered body 101 have positive-electrode-side current collectors 102a extending to the positive-electrode tab 105, and positive-electrode active substance layers, each of which being formed on both main surfaces of a portion of the positive-electrode-side current collector 102a. The positive-electrode-side current collectors 102a constituting the positive plates 102 can be configured from, e.g., aluminum foil, aluminum alloy foil, copper-titanium foil, stainless foil, or another electrochemically stable metallic foil approximately 20 μm thick.

The positive-electrode active substance layers constituting the positive plates 102 are formed by applying, to the main surfaces of a portion of the positive-electrode-side current collectors 102a, a blend of positive-electrode active substance, carbon black or another conductive agent, and an aqueous dispersion of polytetrafluoroethylene or polyvinylidene fluoride, or another binder; and subsequently drying and pressing the blended article on the main surfaces.

The positive-electrode active substance layers constituting the positive plates 102 in the secondary cell 10 of the present embodiment contain, as a positive-electrode active substance, at least a positive-electrode active substance having the feature that resistance increases in accordance with an increase in the SOC. Such a positive-electrode active substance having the feature that resistance increases in accordance with an increase in the SOC is not particularly limited n; examples include a lithium-excess layer electrode material having LiMnO$_3$ as a base structure and specifically include compounds represented by general formula (1) below. In particular, compounds represented by general formula (1) below have high potential and high capacity, and therefore such compounds are used as positive-electrode active substances. This makes it possible for the secondary cell 10 to have high energy density. Compounds represented by general formula (1) below typically take the form of solid solutions.

$$Li_{(2-0.5x)}Mn_{1-x}M_{1.5x}O_3 \quad (1)$$

(In formula (1) above, $0.1 \leq x \leq 0.5$, and M is $Ni_\alpha Co_\beta Mn_\gamma M'_\sigma$ (where $0 < \alpha \leq 0.5$, $0 \leq \beta \leq 0.33$, $0 < \gamma \leq 0.5$, $0 \leq \sigma \leq 0.1$, $\alpha+\beta+\gamma+\sigma=1$, and M' is a metallic element).)

In compounds represented by general formula (1) above, M' may be any metallic element (other than Li, Ni, Co, and Mn) without any particular limitation; M' is preferably at least one element selected from among Fe, V, Ti, Al, and Mg, among which Ti is particularly preferred.

In general formula (1) above, α, β, γ, and σ may be any numbers that satisfy the conditions $0 < \alpha \leq 0.5$, $0 \leq \beta \leq 0.33$, $0 < \gamma \leq 0.5$, $0 \leq \sigma \leq 0.1$, and $\alpha+\beta+\sigma=1$ without any particular limitation; however, preferably σ=0. Specifically, compounds represented by general formula (2) below are particularly preferred.

$$Li_{(2-0.5x)}Mn_{1-x}(Ni_\alpha Co_\beta Mn_\gamma)_{1.5x}O_3 \quad (2)$$

(In formula (2) above, $0.1 \leq x \leq 0.5$, $0 < \alpha \leq 0.5$, $0 \leq \beta \leq 0.33$, $0 < \gamma \leq 0.5$, and $\alpha+\beta+\gamma=1$.)

The positive-electrode active substance layers may contain positive-electrode active substances other than the positive-electrode active substance described above having the feature that resistance increases in accordance with an increase in the SOC; e.g., lithium nickel oxide (LiNiO$_2$), lithium manganese oxide (LiMn$_2$O$_4$), lithium cobalt oxide (LiCoO$_2$), and other lithium compound oxides; and LiFePO$_4$, LiMnPO$_4$, and the like.

Each of the positive-electrode-side current collectors 102a constituting the three positive plates 102 are joined to the positive-electrode tab 105. The positive-electrode tab 105 can be obtained using, e.g., aluminum foil, aluminum alloy foil, steel foil, nickel foil, or the like approximately 0.2 mm thick.

The negative plates 104 constituting the electrode layered body 101 have negative-electrode-side current collectors 104a extending to the negative-electrode tab 106, and negative-electrode active substance layers formed on both main surfaces of a part of the negative-electrode-side current collectors 104a.

The negative-electrode-side current collectors 104a forming the negative plates 104 are, e.g., nickel foil, copper foil, stainless foil, iron foil, or another electrochemically stable metallic foil approximately 10 μm thick.

The negative-electrode active substance layers forming the negative plates 104 are formed by applying, to the main surfaces of a part of the negative-electrode-side current collectors 104a, a slurry prepared by adding together a negative-electrode active substance, carbon black or another conductive agent, polyvinylidene fluoride or another binder, and N-methyl-2-pyrrolidone or another solvent; and subsequently drying and pressing the slurry on the main surfaces.

The negative-electrode active substance forming the negative-electrode active substance layers is not particularly limited; a substance containing at least a negative-electrode active substance having, e.g., silicon or carbon as a main element can be used. Examples of negative-electrode active substances having silicon as a main element include silicon as well as silicon oxide and other silicon compounds. Examples of negative-electrode active substances having carbon as a main element include non-graphitizing carbon, graphitizing carbon, graphite, and the like.

In the secondary cell 10 of the present embodiment, the three negative plates 104 are configured so that each of the negative-electrode-side current collectors 104a forming the negative plates 104 are joined to the single negative-electrode tab 106. Specifically, in the secondary cell 10 of the present embodiment, each of the negative plates 104 is formed so as to be joined to the single common negative-electrode tab 106.

The separators 103 in the electrode layered body 101 prevent short-circuiting between the positive plates 102 and the negative plates 104 described above, and may be provided with the capability to hold the electrolyte. The separators 103 are microporous membranes configured from, e.g., polyethylene (PE), polypropylene (PP), or another polyolefin, the separators 103 having a function whereby, when subjected to an overcurrent, the holes in the layers are obstructed and the current is interrupted due to heat generated by the overcurrent.

As shown in FIG. 3, the positive plates 102 and the negative plates 104 are alternatingly layered with the separators 103 interposed therebetween, and separators 103 are respectively layered on the uppermost and lowermost layers, whereby the electrode layered body 101 is formed.

The electrolyte contained in the secondary cell 10 is a liquid obtained by causing lithium borofluoride (LiBF$_4$), lithium hexafluorophosphate (LiPF$_6$), or another lithium salt to dissolve as a solute in an organic liquid solvent. Examples of the organic liquid solvent constituting the electrolyte can include, e.g., propylene carbonate (PC), ethylene carbonate (EC), butylene carbonate (BC), dimethyl carbonate (DMC), ethyl methyl carbonate (EMC), diethyl carbonate (DEC), methyl formate (MF), methyl acetate (MA), methyl propionate (MP), or another ester-based solvent; alternatively, a blend of the above can be used.

The electrode layered body 101 configured as described above is accommodated and sealed by the upper external covering component 107 and the lower external covering component 108 (sealing means). The upper external covering component 107 and lower external covering component 108 for sealing the electrode layered body 101 are formed from a flexible material such as, e.g., a film made of polyethylene, polypropylene, or another resin; or a plastic/metallic thin-film laminate obtained by laminating both surfaces of a foil made of aluminum or another metal with polyethylene, polypropylene, or another resin. The upper external covering component 107 and the lower external covering component 108 are thermally fused to seal the electrode layered body 101 with the positive-electrode tab 105 and the negative-electrode tab 106 projecting toward the exterior.

A sealing film 109 is disposed on the positive-electrode tab 105 and the negative-electrode tab 106 in order to ensure the upper external covering component 107 and the lower external covering component 108 adhere tightly to the portions at which the upper external covering component 107 and the lower external covering component 108 come into contact with the positive-electrode tab 105 and the negative-electrode tab 106. The sealing film 109 is not limited by any particular configuration, and can be configured from, e.g., polyethylene, modified polyethylene, polypropylene, modified polypropylene, an ionomer, or another synthetic resin material having exceptional electrolyte resistance and thermal adhesiveness.

The secondary cell 10 of the present embodiment is configured as described above.

Figure 4:
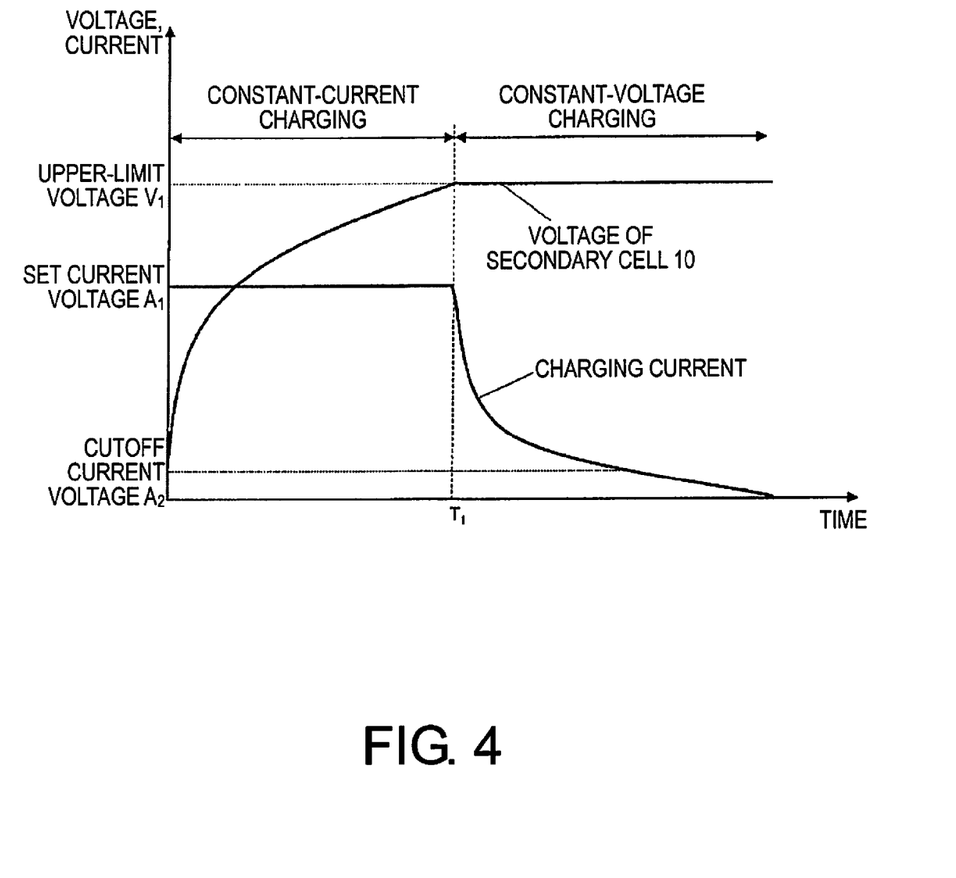
FIG. 4 is a profile showing the charging current and the change in voltage of the secondary cell of the present embodiment when the secondary cell is charged using constant-current/constant-voltage charging.

Next, the method for controlling charging of the secondary cell 10 of the present embodiment is described. In the present embodiment, control over charging the secondary cell 10 described below is performed by the charge control device 20. FIG. 4 is a profile showing the charging current and the change in voltage of the secondary cell 10 of the present embodiment when the secondary cell 10 is charged using constant-current/constant-voltage charging.

As shown in FIG. 4, first, constant-current charging is performed in the present embodiment at an upper-limit voltage $V_1$ and a set current value $A_1$. The upper-limit voltage $V_1$ is not particularly limited; when, e.g., positive-electrode active substances containing a compound represented by general formula (1) above are used as the positive-electrode materials, the upper-limit voltage $V_1$ ordinarily is approximately 4.3-4.5V. Similarly, the set current value $A_1$ is not particularly limited. In the present embodiment, the secondary cell 10 is charged at the set current value $A_1$, whereby, as shown in FIG. 4, the voltage of the secondary cell 10 gradually rises in accordance with an increase in the SOC of the secondary cell 10; e.g., at time $T_1$, the upper-limit voltage $V_1$ is reached.

Next, in the present embodiment, after the voltage of the secondary cell 10 reaches the upper-limit voltage $V_1$, constant-voltage charging is performed at the upper-limit voltage $V_1$. In the present embodiment, when constant-voltage charging is performed at the upper-limit voltage $V_1$, the charging current decays as the SOC of the secondary cell 10 increases, with the voltage of the secondary cell 10 being kept at the upper-limit voltage $V_1$, as shown in FIG. 4. In the present embodiment, when the charging current decays and decreases to the cutoff current value $A_2$, charging of the secondary cell 10 is terminated. The above describes how charging the secondary cell 10 is controlled in the present embodiment.

Next, the method for setting the cutoff current value $A_2$ is described. First, when the cutoff current value $A_2$ is to be set in the present embodiment, a threshold coefficient X is calculated according to formula (3) below based on a cell resistance $R_1$ of the secondary cell 10 at a target SOC (units: Ω), the set current value $A_1$ during constant-current charging described above (units: A), and the upper-limit voltage $V_1$ (units: V).

Threshold coefficient X=(cell resistance $R_1$ of secondary cell in target SOC [Ω]×set current value $A_1$ [A])/upper-limit voltage $V_1$ [V]    (3)

What is meant by "target SOC" in "cell resistance $R_1$ of the secondary cell at a target SOC" is the SOC when, e.g., the secondary cell 10 is charged to the upper-limit voltage $V_1$ at a rate of 0.1 C. Specifically, if, e.g., when the secondary cell 10 is charged at 0.1 C, the SOC at the point in time when the voltage of the secondary cell 10 reaches 4.3V is 50%, then the target SOC upon setting the upper-limit voltage $V_1$ at 4.3V is 50%. Similarly, if the SOC at the point in time when the voltage of the secondary cell 10 reaches 4.4V is 70%, then the target SOC upon setting the upper-limit voltage $V_1$ at 4.4V is 70%, and if the SOC at the point in time when the voltage of the secondary cell 10 reaches 4.5V is 90%, then the target SOC upon setting the upper-limit voltage $V_1$ at 4.5V is 90%. The "cell resistance $R_1$ of the secondary cell at a target SOC," then, can be obtained by measuring the cell resistance when the secondary cell 10 is to be charged to the target SOC.

The relationship between the target SOC and the upper-limit voltage $V_1$ typically changes depending on the type of positive- and negative-electrode active substances forming the secondary cell 10, the type of non-aqueous electrolyte, the balance between the positive and negative electrodes, and other factors. However, secondary cells 10 manufactured with the same design (specifically, secondary cells 10 using the same positive-electrode active substances, negative-electrode active substances, and non-aqueous electrolytes and having the same balance between positive and negative electrodes) will exhibit the same relationship between the target SOC and the upper-limit voltage $V_1$. Therefore, in the present embodiment, it is preferable, e.g., to use different secondary cells 10 manufactured with the same design; to measure, in advance, the relationship between the cell resistance $R_1$ of the secondary cell at a target SOC and the upper-limit voltage $V_1$; and to store the resulting measurements in the charge control device 20.

The method for measuring the "cell resistance $R_1$ of the secondary cell at a target SOC" is not particularly limited; measurement may be performed by, e.g., measuring the alternating-current impedance in a secondary cell 10 charged to the target SOC.

The threshold coefficient X is calculated according to formula (3) above based on the cell resistance $R_1$ of the secondary cell 10 at a target SOC, the set current value $A_1$ during constant-current charging, and the upper-limit voltage $V_1$. Specifically, when the cell resistance $R_1$ of the secondary cell 10 at a target SOC is 7.5Ω, the set current value $A_1$ is 0.035 A, and the upper-limit voltage $V_1$ is 4.5V, the threshold coefficient X is 0.0583 (X=(7.5×0.035)/4.5).

Next, in the present embodiment, the threshold coefficient X thus calculated is used to set the cutoff current value $A_2$. Specifically, the cutoff current value $A_2$ is set so as to comply with formula (4) below, based on the threshold coefficient X and the set current value $A_1$ during constant-current charging.

Cutoff current value $A_2 \geq$ set current value $A_1 \times$ threshold coefficient X    (4)

Specifically, the cutoff current value $A_2$ is set to a value equal to or greater than the product ($A_1 \times X$) of the set current value $A_1$ and the threshold coefficient X.

Rearranging formula (4) gives formula (5) below.

$$\text{Cutoff current value } A_2/\text{set current value } A_1 \geq \text{threshold coefficient } X \quad (5)$$

Therefore, in the present embodiment, the cutoff current value $A_2$ can be set so that the ratio $(A_2/A_1)$ of the cutoff current value $A_2$ with respect to the set current value $A_1$ is equal to or greater than the threshold coefficient X.

In the present embodiment, the cutoff current value $A_2$ can be any value equal to or greater than the product $(A_1 \times X)$ of the set current value $A_1$ and the threshold coefficient X (and less than the set current value $A_1$). If, e.g., the cutoff current value $A_2$ is set to a low value, the secondary cell 10 will have a deeper charge; therefore, the post-charge SOC of the secondary cell 10 can be set relatively high. On the other hand, if the cutoff current value $A_2$ is set to a high value, the post-charge SOC of the secondary cell 10 becomes relatively low, but the time needed for charging decreases.

In the present embodiment, the cutoff current value $A_2$ calculated in this manner is used to perform constant-current/constant-voltage charging on the secondary cell 10; at the point in the constant-voltage charging when the charging current decreases to the cutoff current value $A_2$, the charging for the secondary cell 10 is terminated In the present embodiment, when the secondary cell 10 in which there is used, as a positive-electrode material, a positive-electrode active substance having the feature that resistance increases in accordance with an increase in the SOC is to be charged using constant-current/constant-voltage charging, the cutoff current value $A_2$ for terminating the constant-voltage charging is set equal to or greater than the product $(A_1 \times X)$ of the set current value $A_1$ during constant-current charging and the threshold coefficient X calculated from the cell resistance $R_1$ of the secondary cell at a target SOC, the set current value $A_1$ during constant-current charging, and the upper-limit voltage of charging. Therefore, according to the present embodiment, side reactions associated with excessive current impressing can be suppressed when such a secondary cell 10 is to be charged. This makes it possible to improve the charge/discharge efficiency of the secondary cell 10, resulting in improved cycling characteristics.

In particular, when a positive-electrode active substance having the feature that resistance increases in accordance with an increase in the SOC is used as a positive-electrode material, the positive/negative electrode potential changes in the end stage of charging, and non-aqueous-electrolyte decomposition, lithium deposition, and other side reactions occur, resulting in diminished cycling characteristics. However, according to the present embodiment, the cutoff current value $A_2$ is set equal to or greater than the product $(A_1 \times X)$ of the set current value $A_1$ during constant-current charging and the threshold coefficient X calculated from the cell resistance $R_1$ of the secondary cell at a target SOC, the set current value $A_1$ during constant-current charging, and the upper-limit voltage of charging; and, when the charging current in the constant-voltage charging decays to the cutoff current value $A_2$, charging of the secondary cell 10 is terminated, allowing such problems to be effectively resolved.

In the embodiment described above, the control device 20 corresponds to each of constant-current charging means or device, constant-voltage charging means or device, and charge-stopping means or device in the present invention, as it pertains to the charge control device for a secondary cell.

An embodiment of the present invention is described above; however, this embodiment was described in order to facilitate an understanding of the present invention, and is not particularly limited to the present invention. Therefore, each of the elements disclosed in the embodiment above encompasses all design variants and equivalents belonging to the technical scope of the present invention.

WORKING EXAMPLES

The present invention is described in more detail below based on working examples; however, these examples are not particularly limited to the present invention.

Production of Positive Electrode

Graphite powder, acetylene black (conductive auxiliary agent), and PVDF (binder) were combined so as to have a mass ratio of 90:5:5. N-methyl-2-pyrrolidone was introduced to the resulting combination as a solvent, and these components were mixed to produce negative-electrode slurry. The negative-electrode slurry was then applied to a copper foil (current collector) so as to have a dried thickness of 70 μm. The solvent was dried, whereupon drying was performed in a vacuum for 24 hours, resulting in a negative electrode.

$Li_{1.85}Ni_{0.18}Co_{0.10}Mn_{0.87}O_3$ (positive-electrode active substance; in formula (1) above, x=0.3, α=0.40, β=0.22, γ=0.38, and σ=0), acetylene black (conductive auxiliary agent), and PVDF (binder) were combined so as to have a mass ratio of 90:5:5. N-methyl-2-pyrrolidone was introduced to the resulting combination as a solvent, and these components were mixed to produce positive-electrode slurry. The positive-electrode slurry was then applied to an aluminum foil (current collector) so as to have a dried thickness of 50 μm. The solvent was dried, whereupon drying was performed in a vacuum for 24 hours, resulting in a positive electrode.

Production of Lithium-Ion Secondary Cell

Next, the negative electrode and the positive electrode obtained as described above were set in opposition to each other, and a 20-μm-thick separator made of polyolefin was disposed therebetween, resulting in a layered body comprising a negative electrode, a separator, and a positive electrode. The resulting layered body comprising a negative electrode, a separator, and a positive electrode was placed inside a laminate cell made of aluminum, an electrolyte was injected into the cell, and then the layered body was hermetically sealed, resulting in a lithium-ion secondary cell. 1M $LiPF_6$ in ethylene carbonate (EC):diethyl carbonate (DEC) (1:2 (by volume)) was used as the electrolyte.

Activation of Cell and Measurement of Cell Capacitance

The lithium-ion secondary cell obtained as described above was charged to 4.5V, using a constant-current charge method, at 0.1 C under a 30° C. atmosphere; and then, after being left inactive for ten minutes, was similarly discharged at a constant current of 0.1 C to 2.0V. The constant-current charging at 0.1 C, ten-minute period of inactivity, and constant-current discharging at 0.1 C (cutoff voltage: 2.0V) were then repeatedly performed with the charging upper-limit voltage varied to each of 4.6V, 4.7V, and 4.8V, whereby the cell was activated. In the present example, the discharge capacity when the charging upper-limit voltage was set to 4.8V was 35 mAh, and this value was used as the cell capacitance (specifically, the capacitance when SOC=100%).

Measurement of Cell Resistance

The lithium-ion secondary cell, having been activated as described above, was charged so that SOC=10%, whereupon impressing of current was stopped and the lithium-ion secondary cell was discharged for two hours. Alternating-current impedance measurements were then taken at a voltage width of 10 mV and a frequency of 10 mHz-1 MHz in the lithium-ion secondary cell that was charged so that SOC=10%, whereby the cell resistance was measured.

Then, the same operations were performed at increments of SOC 10% up to SOC=100%, whereby the cell resistance was measured in each of the following states: SOC=10%, 20%, 30%, 40%, 50%, 60%, 70%, 80%, 90%, and 100%.

Charge/Discharge Cycle Testing

Next, a plurality of lithium-ion secondary cells manufactured and activated in the same manner as described above were prepared, and cycle testing was performed under the charge/discharge conditions below.

Working Example 1

A lithium-ion secondary cell was charged, using a constant-current/constant-voltage charging method, for two hours under a 30° C. atmosphere with a set current value $A_1$ of 35 mA (1 C), a cutoff current value $A_2$ of the constant-voltage charging of 17.5 mA ($A_2/A_1=0.5$), and an upper-limit voltage $V_1$ of 4.5V; left inactive for 10 minutes; and then discharged at a constant current of 35 mA (1 C) to 2V. A cycle test in which this process constituted one cycle was performed for 100 cycles. In working example 1, the target SOC was 90%, and the cell resistance at this time measured according to the method described above was 7.5Ω. Therefore, the threshold coefficient X was set to 0.0583 (X=(7.5×0.035)/4.5). Because $A_2/A_1=0.5$, working example 1 satisfies the condition $A_2/A_1 \geq X$. Table 1 shows the capacity retention at the 100th cycle (=discharge capacity at 100th cycle/discharge capacity at 1st cycle×100(%)).

Working Example 2

100 cycles of the cycle test were performed in the same manner as in working example 1, other than that the cutoff current value $A_2$ of the constant-voltage charging was changed to 8.75 mA ($A_2/A_1=0.25$). In working example 2, the threshold coefficient X was set to 0.0583, the same as in working example 1. Because $A_2/A_1=0.25$, working example 2 satisfies the condition $A_2/A_1 \geq X$. Table 1 shows the capacity retention at the 100th cycle.

Working Example 3

100 cycles of the cycle test were performed in the same manner as in working example 1, other than that the cutoff current value $A_2$ of the constant-voltage charging was changed to 3.5 mA ($A_2/A_1=0.1$). In working example 3, the threshold coefficient X was set to 0.0583, the same as in working example 1. Because $A_2/A_1=0.1$, working example 3 satisfies the condition $A_2/A_1 \geq X$. Table 1 shows the capacity retention at the 100th cycle.

Comparative Example 1

100 cycles of the cycle test were performed in the same manner as in working example 1, other than that the cutoff current value $A_2$ of the constant-voltage charging was changed to 1.75 mA ($A_2/A_1=0.05$). In comparative example 1, the threshold coefficient X was set to 0.0583, the same as in working example 1. However, because $A_2/A_1=0.05$, comparative example 1 does not satisfy the condition $A_2/A_2 \geq X$. Table 1 shows the capacity retention at the 100th cycle.

Comparative Example 2

100 cycles of the cycle test were performed in the same manner as in working example 1, other than that the cutoff current value $A_2$ of the constant-voltage charging was changed to 1.05 mA ($A_2/A_1=0.03$). In comparative example 2, the threshold coefficient X was set to 0.0583, the same as in working example 1. However, because $A_2/A_1=0.03$, comparative example 2 does not satisfy the condition $A_2/A_1 \geq X$. Table 1 shows the capacity retention at the 100th cycle.

Comparative Example 3

100 cycles of the cycle test were performed in the same manner as in working example 1, other than that the cutoff current value $A_2$ of the constant-voltage charging was changed to 0.525 mA ($A_2/A_1=0.015$). In comparative example 3, the threshold coefficient X was set to 0.0583, the same as in working example 1. However, because $A_2/A_1=0.015$, comparative example 3 does not satisfy the condition $A_2/A_1 \geq X$. Table 1 shows the capacity retention at the 100th cycle.

Comparative Example 4

A lithium-ion secondary cell was charged, using a constant-current/constant-voltage charging method, for two hours under a 30° C. atmosphere with a set current value $A_1$ of 35 mA (1 C) and an upper-limit voltage $V_1$ of 4.5V; left inactive for 10 minutes; and then discharged at a constant current of 35 mA (1 C) to 2V. A cycle test in which this process constituted one cycle was performed for 100 cycles. Specifically, in comparative example 4, constant-current/constant-voltage charging was performed without a cutoff current value $A_2$ being set. Table 1 shows the capacity retention at the 100th cycle.

TABLE 1

|  | Value of $A_2/A_1$ | Capacitance retention rate at 100th cycle |
| --- | --- | --- |
| Working example 1 | 0.5 | 92% |
| Working example 2 | 0.25 | 90% |
| Working example 3 | 0.1 | 90% |
| Comparative example 1 | 0.05 | 83% |
| Comparative example 2 | 0.03 | 76% |
| Comparative example 3 | 0.015 | 67% |
| Comparative example 4 | 0 (cutoff current not set) | 41% |

Evaluation of Working Examples 1-3 and Comparative Examples 1-4

Table 1 combines the results for working examples 1-3 and comparative examples 1-4 in which the cycle tests were performed with an upper-limit voltage $V_1$ of 4.5.

Figure 5:
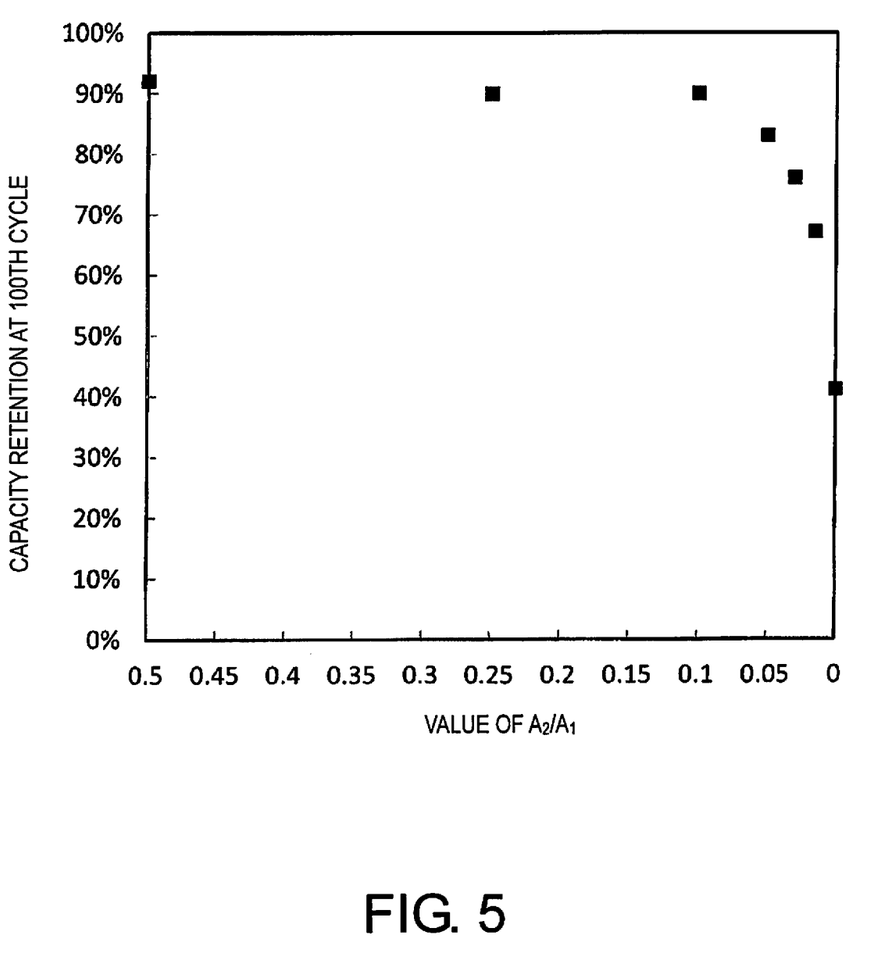
FIG. 5 is a graph showing the relationship between the "cutoff current value $A_2$/set current value $A_1$" value obtained in the working and comparative examples, and the capacity retention at the 100th cycle.

As shown in Table 1, the results obtained for working examples 1-3, in which a current value satisfying the condition $A_2/A_1 \geq X$ was adopted as the cutoff current value $A_2$, were all excellent in that the capacity retention at the 100th cycle was 90% or higher. However, comparative examples 1-3, in which a current value not satisfying the condition $A_2/A_1 \geq X$ was set as the cutoff current value $A_2$, and comparative example 4, in which no cutoff current value $A_2$ was set, all had inferior cycling characteristics in that the capacity retention at the 100th cycle was less than 80%. FIG. 5 shows a graph depicting the relationship between the value of $A_2/A_1$ and the capacity retention at the 100th cycle for working examples 1-3 and comparative examples 1-4. As can be ascertained from FIG. 5, when the condition $A_2/A_1 \geq X$ is satisfied (specifically, when $A_2/A_1 \geq 0.0583$), the capacity retention at the 100th cycle is a high value of 90% or higher, and that stable results can be obtained. In FIG. 5, comparative example 4, in which no cutoff current value $A_2$ was set, is displayed at $A_2/A_1=0$.

Working Example 4

A lithium-ion secondary cell was charged, using a constant-current/constant-voltage charging method, for two hours under a 30° C. atmosphere with a set current value $A_1$ of 35 mA (1 C), a cutoff current value $A_2$ of the constant-voltage charging of 1.75 mA ($A_2/A_1=0.05$), and an upper-limit voltage $V_1$ of 4.4V; left inactive for 10 minutes; and then discharged at a constant current of 35 mA (1 C) to 2V. A cycle test in which this process constituted one cycle was performed for 100 cycles. In working example 4, the target SOC was 70%, and the cell resistance at this time measured according to the method described above was 4Ω. Therefore, the threshold coefficient X was set to 0.0318 ($X=(4\times0.035)/4.4$). Because $A_2/A_1=0.05$, working example 4 satisfies the condition $A_2/A_1 \geq X$. Table 2 shows the capacity retention at the 100th cycle.

Comparative Example 5

A lithium-ion secondary cell was charged, using a constant-current/constant-voltage charging method, for two hours under a 30° C. atmosphere with a set current value $A_1$ of 35 mA (1 C) and an upper-limit voltage $V_1$ of 4.4V; left inactive for 10 minutes; and then discharged at a constant current of 35 mA (1 C) to 2V. A cycle test in which this process constituted one cycle was performed for 100 cycles. Specifically, in comparative example 5, constant-current/constant-voltage charging was performed without a cutoff current value $A_2$ being set. Table 2 shows the capacity retention at the 100th cycle.

TABLE 2

| | Value of $A_2/A_1$ | Capacitance retention rate at 100th cycle |
| --- | --- | --- |
| Working example 4 | 0.05 | 93% |
| Comparative example 5 | 0 (cutoff current not set) | 38% |

Evaluation of Working Example 4 and Comparative Example 5

Table 2 combines the results for working example 4 and comparative example 5 in which the cycle tests were performed with an upper-limit voltage $V_1$ of 4.4.

As shown in Table 2, the results obtained for working example 4, in which a current value satisfying the condition $A_2/A_1 \geq X$ was adopted as the cutoff current value $A_2$, were excellent in that the capacity retention at the 100th cycle was 90% or higher. However, comparative example 5, in which no cutoff current value $A_2$ was set, had extremely inferior cycling characteristics in that the capacity retention at the 100th cycle was less than 40%.

Working Example 5

A lithium-ion secondary cell was charged, using a constant-current/constant-voltage charging method, for two hours under a 30° C. atmosphere with a set current value $A_1$ of 35 mA (1 C), a cutoff current value $A_2$ of the constant-voltage charging of 1.75 mA ($A_2/A_1=0.05$), and an upper-limit voltage $V_1$ of 4.3V; left inactive for 10 minutes; and then discharged at a constant current of 35 mA (1 C) to 2V. A cycle test in which this process constituted one cycle was performed for 100 cycles. In working example 5, the target SOC was 50%, and the cell resistance at this time measured according to the method described above was 4Ω. Therefore, the threshold coefficient X was set to 0.0325 ($X=(4\times0.035)/4.3$). Because $A_2/A_1=0.05$, working example 5 satisfies the condition $A_2/A_1 \geq X$. Table 3 shows the capacity retention at the 100th cycle.

Comparative Example 6

A lithium-ion secondary cell was charged, using a constant-current/constant-voltage charging method, for two hours under a 30° C. atmosphere with a set current value $A_1$ of 35 mA (1 C) and an upper-limit voltage $V_1$ of 4.4V; left inactive for 10 minutes; and then discharged at a constant current of 35 mA (1 C) to 2V. A cycle test in which this process constituted one cycle was performed for 100 cycles. Specifically, in comparative example 6, constant-current/constant-voltage charging was performed without a cutoff current value $A_2$ being set. Table 3 shows the capacity retention at the 100th cycle.

TABLE 3

| | Value of $A_2/A_1$ | Capacitance retention rate at 100th cycle |
| --- | --- | --- |
| Working example 5 | 0.05 | 93% |
| Comparative example 6 | 0 (cutoff current not set) | 65% |

Evaluation of Working Example 5 and Comparative Example 6

Table 3 combines the results for working example 5 and comparative example 6 in which the cycle tests were performed with an upper-limit voltage $V_1$ of 4.3.

As shown in Table 3, the results obtained for working example 5, in which a current value satisfying the condition $A_2/A_1 \geq X$ was adopted as the cutoff current value $A_2$, were excellent in that the capacity retention at the 100th cycle was 90% or higher. However, comparative example 6, in which no cutoff current value $A_2$ was set, had inferior cycling characteristics in that the capacity retention at the 100th cycle was less than 70%.

The invention claimed is:

1. A method for controlling charging of a secondary cell including a positive electrode containing a positive-electrode active substance having a resistance that increases in accordance with an increase in SOC, a negative electrode, and a non-aqueous electrolyte, the method comprising:
performing constant-current charging at a set current value $A_1$ to a prescribed upper-limit voltage $V_1$;
performing constant-voltage charging at the upper-limit voltage $V_1$ after the upper-limit voltage $V_1$ has been reached; and
terminating charging of the secondary cell when a charging current in the constant-voltage charging has decreased to a cutoff current value, $A_2$
the cutoff current value $A_2$ being set to a current value that complies with the relationships in formulas (I) and (II), Cutoff current value $A_2 \geq$ set current value $A_1 \times X$     (I)

$X = $(cell resistance $R_1$ of secondary cell at target SOC $[\Omega] \times$set current value $A_1$ [A])/upper-limit voltage $V_1$ [V]     (II).

2. The method of claim 1, wherein
the positive-electrode active substance contains a compound represented by formula (III)

$$Li_{(2-0.5x)}Mn_{1-x}M_{1.5x}O_3 \quad (III)$$

(In formula (III), $0.1 \leq x \leq 0.5$, and
M is $Ni_\alpha Co_\beta Mn_\gamma M'_\sigma$
(where $0 < \alpha \leq 0.5$, $0 \leq \beta \leq 0.33$, $0 < \gamma \leq 0.5$, $0 \leq \sigma \leq 0.1$, $\alpha + \beta + \gamma + \sigma = 1$,
and M' is a metallic element)).

3. The method of claim 1, wherein
the negative electrode contains a negative-electrode active substance having at least one of silicon and carbon as a main element.

4. A charge control device for controlling charging of a secondary cell including a positive electrode containing a positive-electrode active substance having a resistance that increases in accordance with an increase in SOC, a negative electrode, and a non-aqueous electrolyte, the charge control device comprising:

a constant-current charging device configured to perform constant-current charging at a set current value $A_1$ to a prescribed upper-limit voltage $V_1$;

a constant-voltage charging device configured to perform constant-voltage charging at the upper-limit voltage $V_1$ after the upper-limit voltage $V_1$ has been reached; and a charging-stopping device configured to determine whether a charging current in the constant-voltage charging has decreased to a cutoff current value $A_2$, and, when the charging-stopping device has determined that the charging current has decreased to the cutoff current value $A_2$, stopping charging of the secondary cell the charge-stopping device configured to set the cutoff current value $A_2$ at a current value that complies with the relationships in formulas (I) and (II)

Cutoff current value $A_2 \geq$ set current value $A_1 \times X$     (I)

$X = $(cell resistance $R_1$ [$\Omega$] of secondary cell at target SOC×set current value $A_1$ [A])/upper-limit voltage $V_1$ [V]     (II).

5. The method of claim 2, wherein
the negative electrode contains a negative-electrode active substance having at least one of silicon and carbon as a main element.

\* \* \* \* \*